No. 855,188. PATENTED MAY 28, 1907.
A. LARSEN.
HOOF PAD.
APPLICATION FILED DEC. 3, 1906.

Witnesses:
Christen Sorenson
Edwin J Reid

Inventor:
Andru Larsen
By James Reid,
Attorney.

UNITED STATES PATENT OFFICE.

ANDRŬ LARSEN, OF CHICAGO, ILLINOIS.

HOOF-PAD.

No. 855,188.      Specification of Letters Patent.      Patented May 28, 1907.

Application filed December 3, 1906. Serial No. 346,058.

*To all whom it may concern:*

Be it known that I, ANDRŬ LARSEN, of Chicago, in the county of Cook and State of Illinois, have invented certain new and useful improvements in Hoof-Pads; and I do hereby declare that the following is a full, clear, and exact description thereof, reference being had to the accompanying drawings, and to the letters of reference marked thereon, which form a part of this specification.

My invention relates to improvements in hoof-pads, of that class which is designed to be interposed between the hoof of a horse and the shoe and to extend between the shoe bars, and embodies as a part of the construction thereof certain of the features set forth in my United States Letters Patent, Nos. 740,665 and 751,184.

The object of my invention is to provide a pad which will protect the softer parts of the foot of the animal from injury due to contact of the foot with nails, stones, and the like found on the roadway.

The invention consists of the matters hereinafter set forth and more particularly pointed out in the appended claims.

Figure 1:
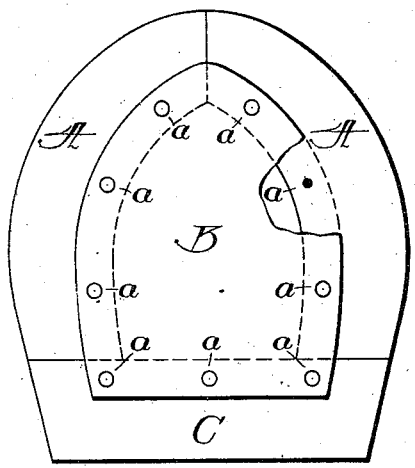
Figure 2:
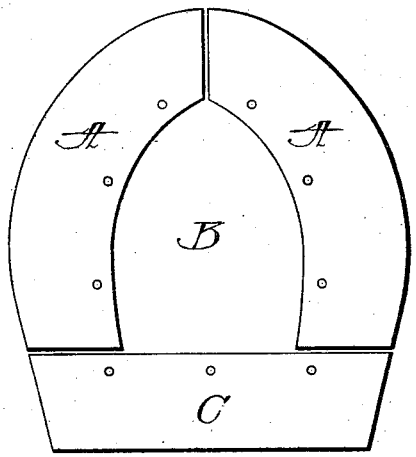

In the drawings, Figure 1 is a bottom plan view of a hoof-pad embodying my invention; Fig. 2, a plan view of the two parts which constitute the rim of the pad: also the new transverse strip removed from the shield; and Fig. 3, a plan view of the metal shield or center-piece of the pad.

Figure 3:
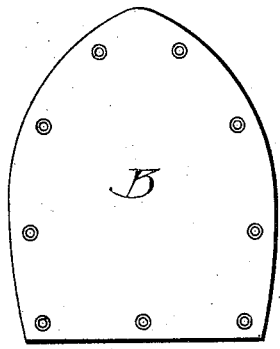

As shown in said drawings, said pad embraces in general terms a rim A, made of any suitable flexible material and of the general contour of a horseshoe: a central metal plate or shield B, (as shown in my said prior applications) and a relatively wide transverse leather strip C at the rear end of said rim A, and shield B, said shield B, is attached at its outer margin to the inner margin of the rim A, and the transverse strip C by rivets $a$ in the manner shown in Fig. 1. Said rim is made slightly wider than the bars of the shoe, and the outer margin of said rim when in place on the hoof is substantially flush with the outer margin of the shoe, while the inner margin thereof extends beyond the inner margin of the bars of the shoe for attachment therewith of the shield B. Said shield B may be made of a single thickness of metal, as shown in Figs. 1 and 3, and may be attached to the said rim A, and the transverse strip C by means of rivets $a$ extending through the overlapping margins of the said rim, transverse strip, and shield.

In the construction of the above described pad, the rim A, (except as modified, see Figs. 1 and 2) and the shield B, are made and used in accordance with the specifications and drawings as shown in one of my aforesaid Letters Patent, to-wit: No. 751,184.

In addition to the modified rim A, and the shield B, as shown in Fig. 1, I apply to the rear of said pad, a relatively wide transverse strip of leather C, as shown in Figs. 1 and 2, which extends from one side of the pad to the other and is attached to the shield B by means of rivets $a$ which extend through the overlapping parts of the shield B and the transverse strip C.

I claim:

The combination, in a hoof-pad, adapted to be interposed between the hoof of the horse and the shoe, said pad comprising a flexible rim made in two like halves or parts and of the general contour of a horseshoe; a central metal plate or shield which is attached at its outer margin to the inner margin of said rim, and a transverse leather strip which extends from one side of the pad to the other, said transverse strip overlapping at its forward edge the rear edge of said central plate or shield and attached thereto by rivets, all substantially as set forth.

ANDRŬ LARSEN.

Witnesses:
    CHRISTEN SORENSON,
    EDWIN J. REID.